(12) United States Patent
Fioroni

(10) Patent No.: US 6,666,632 B1
(45) Date of Patent: Dec. 23, 2003

(54) TWIN-SPINDLE MACHINING TOOL

(75) Inventor: Claude Fioroni, Castres (FR)

(73) Assignee: Renault Automation Comau, Trappes Cedex (FR)

( * ) Notice: Subject to any disclaimer, the term of this patent is extended or adjusted under 35 U.S.C. 154(b) by 0 days.

(21) Appl. No.: 10/070,533

(22) PCT Filed: Sep. 6, 2000

(86) PCT No.: PCT/FR00/02449

§ 371 (c)(1),
(2), (4) Date: Jul. 15, 2002

(87) PCT Pub. No.: WO01/17723

PCT Pub. Date: Mar. 15, 2001

(30) Foreign Application Priority Data

Sep. 7, 1999 (FR) .............................. 99 11227

(51) Int. Cl.$^7$ .............................. B23C 3/00; B23B 9/00
(52) U.S. Cl. ..................... 409/192; 409/235; 82/121
(58) Field of Search ................. 409/192, 203, 409/213, 217, 235; 82/122, 121, 120, 129, 118

(56) References Cited

U.S. PATENT DOCUMENTS

| | | | | |
|---|---|---|---|---|
| 4,596,500 A | * | 6/1986 | Raiteri | 408/3 |
| 5,203,061 A | | 4/1993 | Hamada | |
| 5,265,986 A | | 11/1993 | Prokopp | |
| 5,321,874 A | * | 6/1994 | Mills et al. | 29/33 P |
| 5,368,425 A | | 11/1994 | Mills et al. | |
| 5,944,643 A | | 8/1999 | Koelblin et al. | |
| 6,161,457 A | * | 12/2000 | Hammer | 82/121 |
| 6,174,271 B1 | * | 1/2001 | Kosmowski | 483/1 |
| 6,217,496 B1 | * | 4/2001 | Lindem | 483/30 |

FOREIGN PATENT DOCUMENTS

| | | |
|---|---|---|
| DE | 40 20 997 A | 1/1992 |
| EP | 1 004 397 A | 5/2000 |
| WO | WO 97 27026 A | 7/1997 |

* cited by examiner

*Primary Examiner*—A. L. Wellington
*Assistant Examiner*—Dana Ross
(74) *Attorney, Agent, or Firm*—Sughrue Mion, PLLC

(57) ABSTRACT

A high speed machining machine tool (M) of the type that allows the independent setting into motion along at least three axis of two tool carrying slide (100 and 100'). This machine tool implements said motions of each slide by linear motors.

5 Claims, 4 Drawing Sheets

TWIN-SPINDLE MACHINING TOOL

FIELD OF APPLICATION OF THE INVENTION

This invention deals with the field of machine tools of the type that includes two independent carrying tool broaches and especially to adaptations allowing to perform with such machine tools a machining in the best conditions of rapidity and precision.

DESCRIPTION OF PRIOR ART

In order to improve the productivity of machine tools such as very high speed machining centres, the designers of machine tools have developed in the course of the last years machine tools called bi-broach machine tools implementing two independent carrying tool broaches instead of a single broach.

It was noticed that on mono-broach machining machine tools at very high speed, the effective cutting time only represented half of the time of use of the machine tool, the remaining of the time being used for the changing of tools. As a matter of fact, by improving the running time as well as the rapidity of the machinings, and by providing the machine tool with a great quantity of tools in order to allow it to offer a great range of machining possibilities, the designers noticed that the time for the changing of tools represented the main difficulty to solve for the optimization of the productivity of a machine tool. A first solution to such problem having been to decrease the machining time, another solution was to develop a machine tool concept, which adopted not a single carrying electrobroach slide mobile along three axis but two carrying electorobroach slide mobile along three axis. A great advantage of such concept is to allow the machining of a piece with a first carrying tool broach while the second broach is changing tools, and vice versa. Therefore, when a machining phase is performed by a rotating tool placed at the extremity of a first carrying electrobroach slide is achieved on the piece, a second phase may start without any resting time by means of a rotating tool placed on the extremity of the second carrying electrobroach slide, the first slide moving away from the piece and moving towards its device of tool changing.

It was noticed that the gain of productivity obtained greatly compensated the overcoat due to the purchase of a machine tool of the bi-broach type when compared to a machine tool of the mono-broach type.

However, classical machine tools, which adopt the bi-broach concept, experience a decrease of productivity and efficiency because of the use of a motorisation of the ballscrew type, the performances of which do not always meet the criteria of performance rapidity and of reliability of the very high speed machining.

DESCRIPTION OF THE INVENTION

In order to optimize the productivity of such machine tools implementing two carrying tool slides, especially in the drive in motion of said slide, the applicant led researches that led to a machine tool of a bi-broach type ensuring machinings more rapidly by implementing a motorisation and a kinematic architecture adapted to said motorisation, particularly new and inventive.

According to the main feature of the invention, the machining machine tool of the type that ensures the putting in motion along at least three axis of two carrying electro-broach slides, it remarkable in that said motions are implemented by means of linear motors.

Such feature is particularly advantageous in that a kinematic structure using the bi-broach concept is provided with a motorisation ensuring a great speed in the motions of the various modules of said architecture and along the three axis. Therefore, not only the changing of tools may be done in hidden time, that is a broach may change tools while another one performs a machining, but also the running times of such slide will be decreased by means of linear motors. Indeed, linear motors that are better suited for high speed machining, especially when they function in pairs, have for advantage to provide great accelerations and an optimal precision in their displacement.

Moreover, the association of a new motorisation with a kinematic architecture using the bi-broach concept led the applicant to imagine a kinematic structure adapted to such association.

Thus, according to a particularly advantageous feature of the invention, when the machine tool is of the type that is provided with a plurality of guiding means corresponding to linear motions along three axis X, Y and Z of the two slides, each one of them being associated to a linear motorisation provided by one or several linear motors of the type where each one of them contains a mobile primary block and a fixed secondary block, said machine tool is remarkable in that the independent and mobile primary blocks of said linear motors ensuring the independent rectilinear motion of each of the two slides along at least one of the three axis, share two by two a single and same secondary block.

Therefore, the applicant is advantageously making full use of the components of a linear motorisation in order to decrease the number of pieces on a same axis of motion, a single secondary block for two primary blocks that are each linked to a different mobile part.

Likewise, according to another particularly advantageous feature, said linear motors, the primary blocks of which share two by two a single and same secondary block, share two by two a single and same measuring rule on which there is a motion of as many cursors as they are primary blocks. The fundamental concepts of the invention having been set forth in their most elementary form, other details and features will come forth more clearly when reading the following description with respect to the attached drawings, giving a non limiting example an embodiment of a machine tool according to the invention.

SHORT DESCRIPTION OF THE DRAWINGS

DESCRIPTION OF THE PREFERRED EMBODIMENTS

Figure 1:
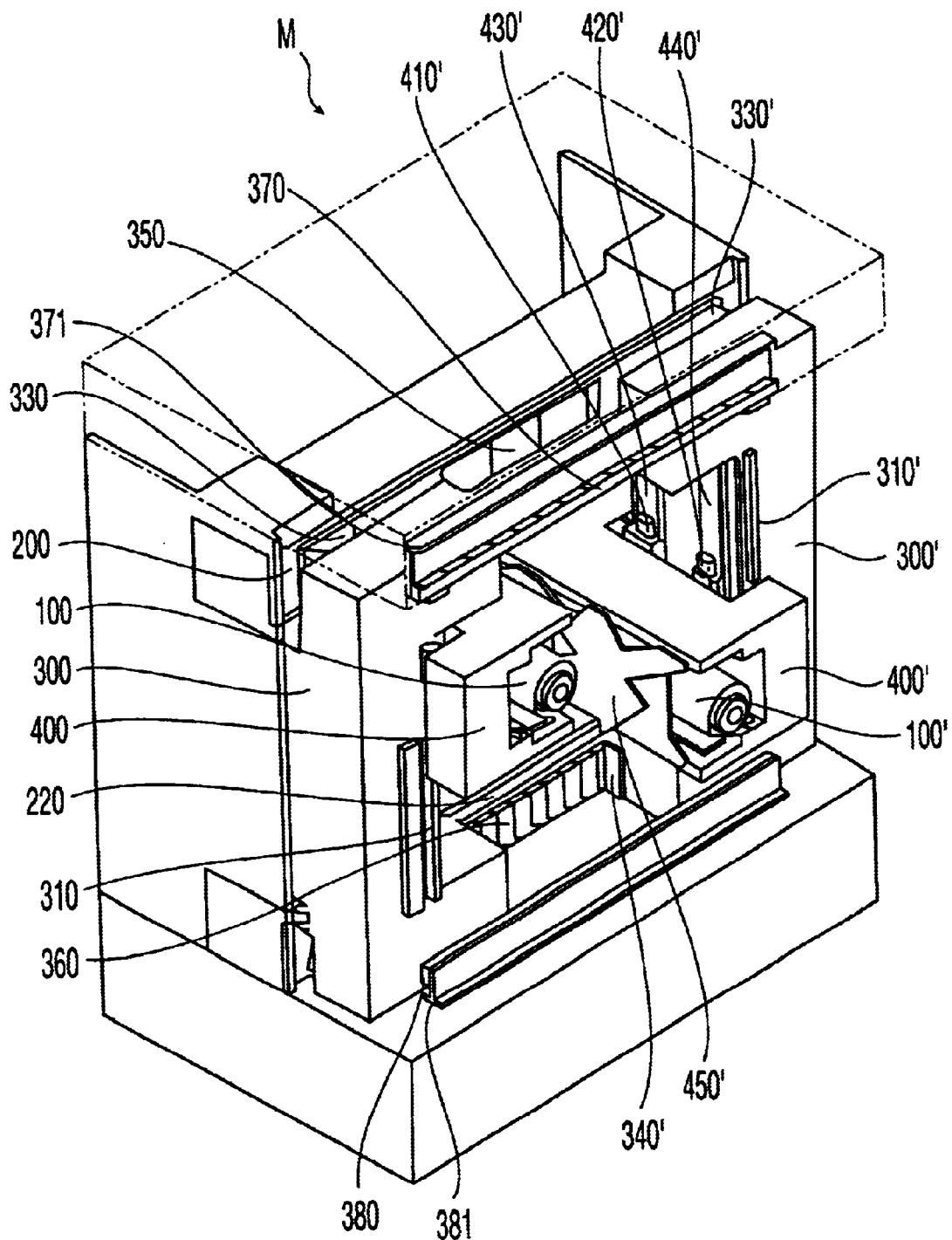
FIG. 1 represents a global view of the front part of a machine tool according to the invention.

Such as shown on the drawing of FIG. 1, the high speed machining machine tool referenced M in its whole is of the type that ensures the setting into motion on three axis, a first horizontal and transverse axis X, a second transverse axis Y perpendicular to the first one, and a third transverse axis Z perpendicular to the two first axis, of two carrying tool slides 100 and 100' by means of linear drives associated to guiding means comprised of pairs of rails.

Such machine tool M is provided with a symmetric structure and is comprised of a first pair of rails 210 and 220 placed on a vertical plane materialized by a fixed vertical frame 200, on said rails are guided in translational motional motion along axis X two vertical half tables 300 and 300'. A second pair of rails 310, 320 and 310', 320' (see FIG. 4) is placed on each portal 300 and 300' and guides in translational motional motion along axis Y a spindle head 400 and 400'. A third pair of rails 110, 130 and 110', 130' is placed on each spindle head 400 and 400' and guides in translational motional motion along axis Z perpendicular to the two first axis, a slide 100 and 100', a tool (not shown) being driven on the extremity of said slide.

Figure 2:
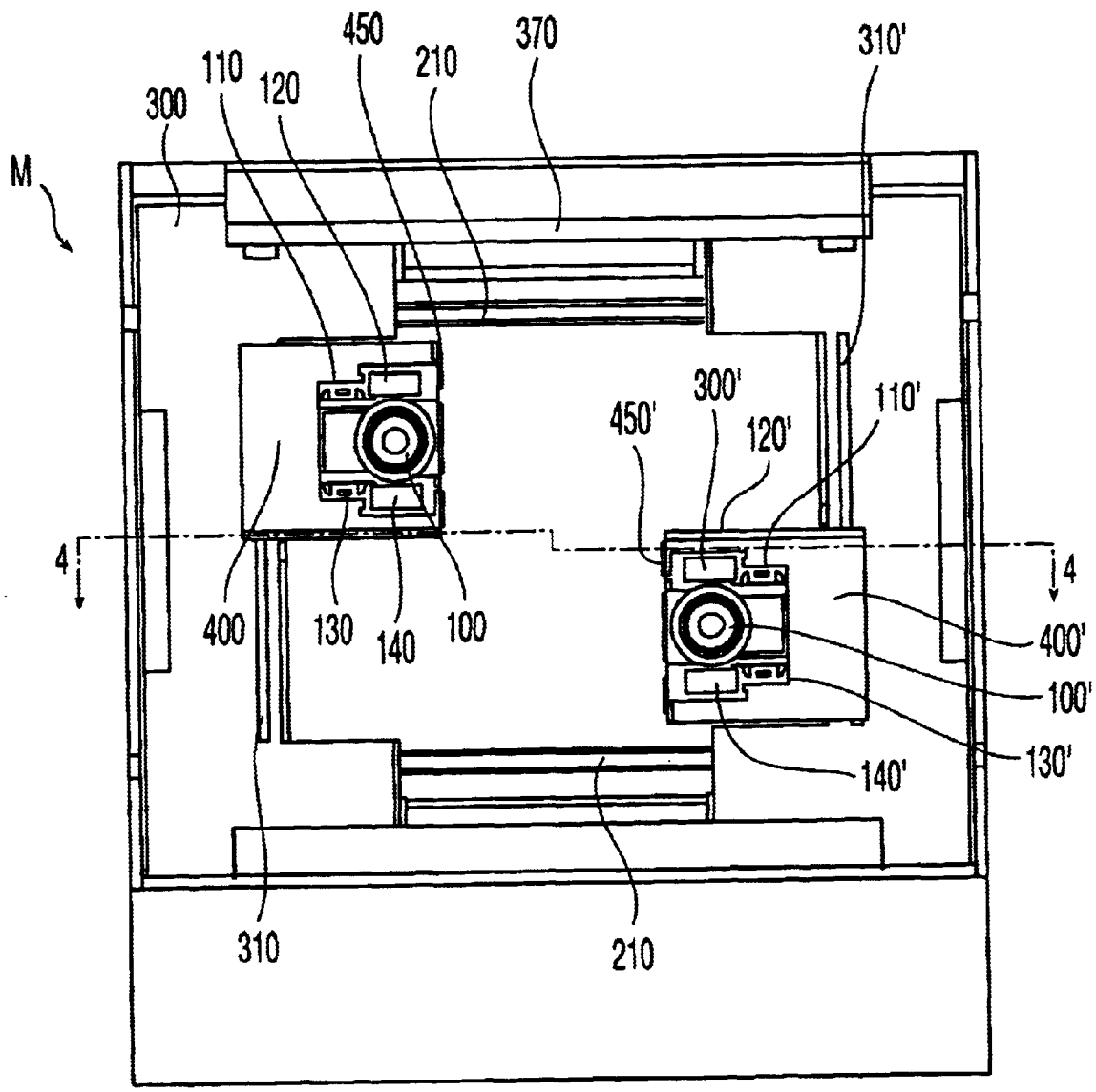
FIG. 2 represents a front view of the front part of the machine tool of FIG. 1

As it better appears of the drawing of FIG. 2, said vertical frame 200 is provided with an opening between the two rails 210 and 220 of the first pair, opening which is partially occupied by the back part of the two spindle heads 400 and 400'.

According to the main feature of the invention, said motions along axis X, Y and Z, respectively of the vertical half tables 300 and 300', of the spindle heads 400 and 400' and of the slide 100 and 100' are implemented by the linear motors.

More precisely, the two vertical half tables 300 and 300' are identical and are each driven by two linear motors by means of the primary blocks 330, 340 (see FIG. 3) and 330', 340', to which they are linked.

According to one of the features of the invention, the primary blocks 330, 340 associated with the half table 300 and 330', 340' associated with the half table 300' of the linear motors ensuring the independent rectilinear motion of the two slides 100 and 100' along axis X, share two by two a single and same secondary block respectively 350 and 360. Therefore, according to the non limiting embodiment shown, the primary blocks 330 and 330' are associated to the same secondary block 350 and the primary blocks 340 and 340' are associated to the same secondary block 360.

According to the shown and non limiting embodiment, the fixed and unique secondary blocks 350 and 360 associated with said primary blocks are arranged so that they are on the same plane as said guiding rails 210 and 220 along axis X of the two vertical half tables 300 and 300', that is on the vertical plane materialized by said vertical frame 200.

According to another particularly advantageous feature of the invention, said linear motors, the primary blocks 330, 330' and 340, 340' of which share two by two a single and same secondary block, that is respectively 350 and 360, also share two by two a single and same measuring rule. Therefore, the vertical half tables 300 and 300' are associated at the level of their front part with only two fixed measuring rules 370 and 380 and not to four rules according to the classical implementations of linear motors. Thus, each one of such measuring rules 370 and 380 sends its measure on the half tables 300 and 300' by means of the reading cursors.

Figure 3:
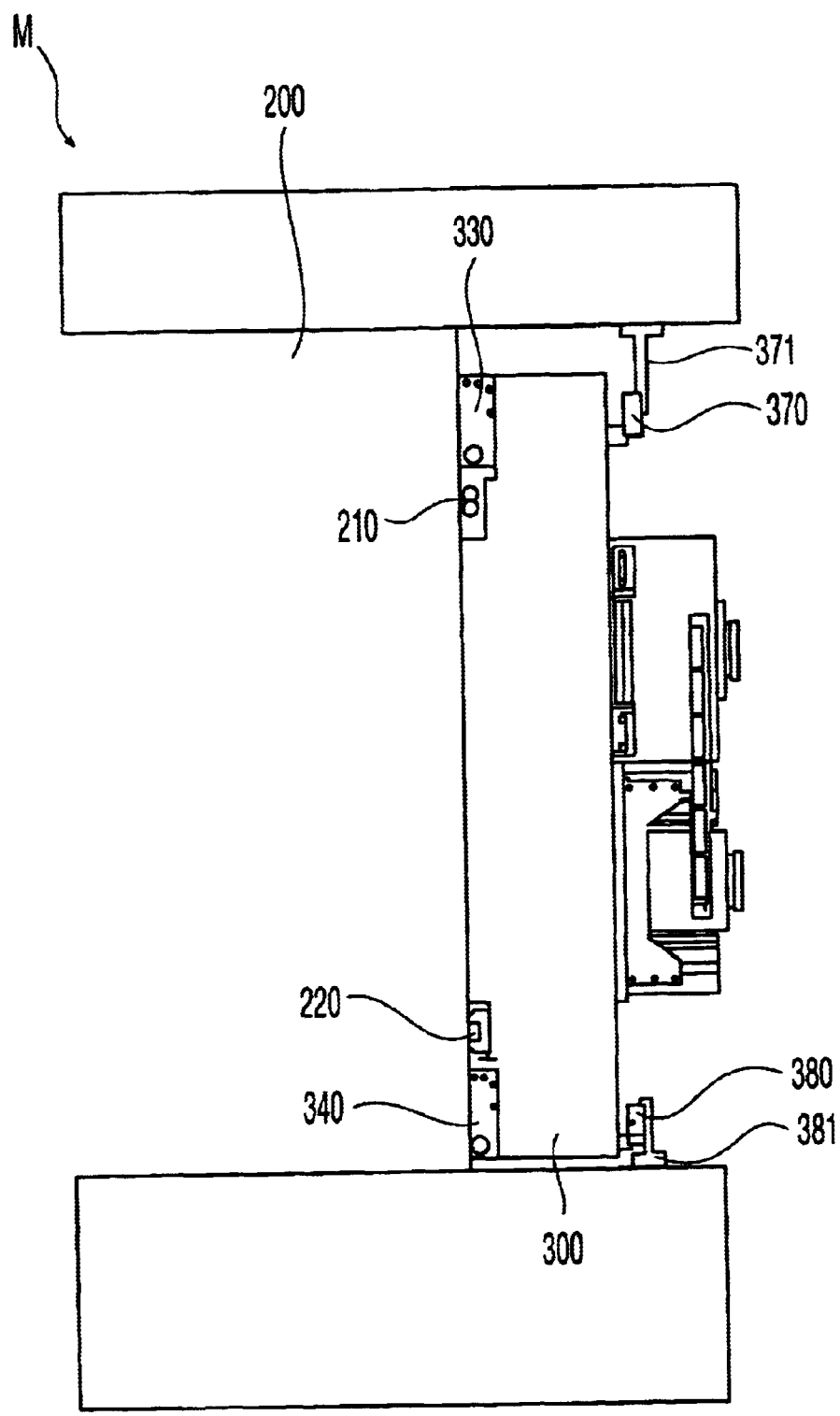
FIG. 3 represents a left slide view of the front part of the machine tool of FIG. 1.

As shown on FIGS. 1 and 3, a solution for fixing said measuring rules consists in the fixation of the latter on beams 371 and 381 of the type that have a T shape, such T shapes being linked to the fixed frame 200.

Figure 4:
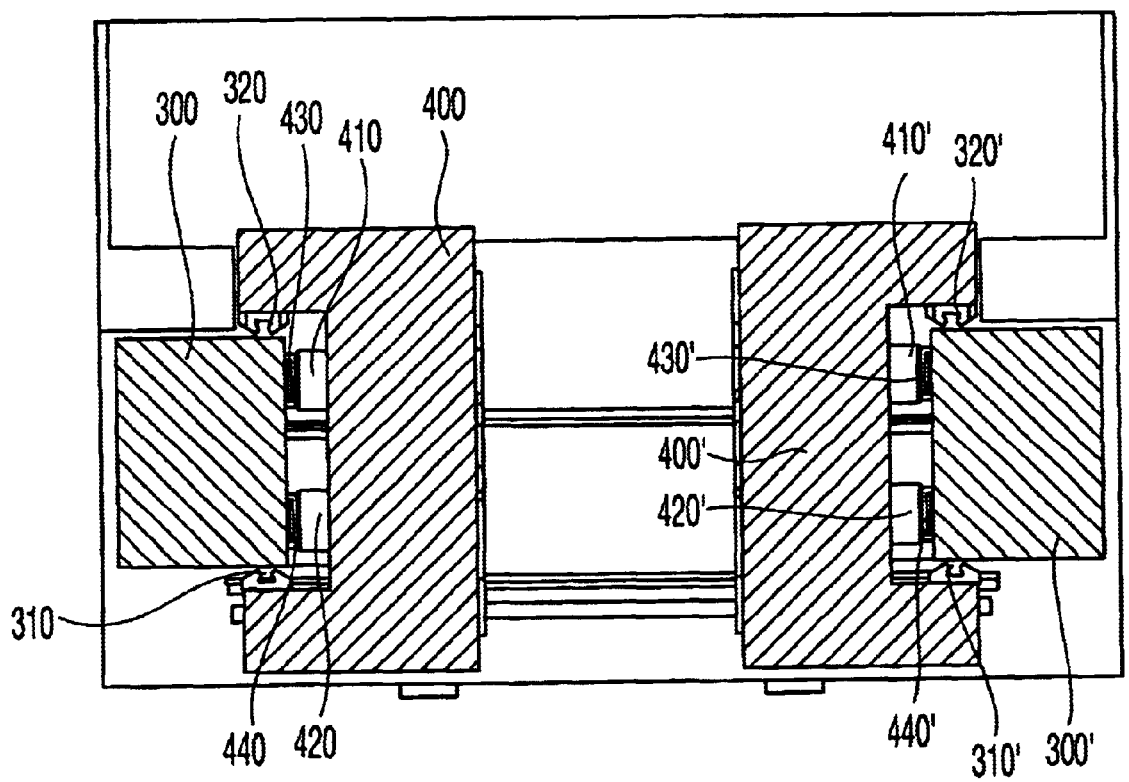
FIG. 4 represents a cutaway bottom view, taken along the line 4—4 in FIG. 2.

As shown in more details in FIG. 4, the two vertical half tables 300 and 300' are arranged so that the pairs of guiding rails 310, 320 and 310', 320' along axis Y of the two spindle heads 400 and 400' are arranged on two planes parallel to each other and perpendicular to the vertical guiding plane along axis X defined by the first pair of rails 210 and 220.

According to another particularly advantageous feature of the invention, the two vertical half tables 300 and 300' are symmetrical and each have a C shape facing each other and the two spindle heads 400 and 400' and consequently the two slides 100 and 100' are provided with a translational motion between the branches of said C shapes. One of the advantages of the C shape adopted by the vertical half tables is to allow at least an opening between its branches in order to permit the motion along axis Y and along axis Z of the slide.

According to the shown embodiment, the spindle heads 400 and 400' are each associated with two linear motors, the mobile primary blocks 410, 420 of which associated with the spindle head 400 and 410', 420', associated with the spindle head 400' each move on a fixed secondary block, respectively 430, 440 and 430', 440, which is arranged on a plane perpendicular to the planes on which are fixed the guiding rails along axis X. Thus, according to the shown embodiment, the guiding planes along axis X and the guiding planes along axis Y are perpendicular. Therefore, the kinematic structure adopted by the machining machine tool of the bi-broach type of the invention is not only a simple adaptation or multiplication by two of a kinematic structure of a machine tool of the mono-broach type. As a matter of fact, the feature of the classical high speed machining machine tools using a slide moving along three axis is to offer a guiding plane along axis X contrarily to what the machine tool of the invention offers, said machine tool having to take into account different criteria, such as the capacity of the slides to come close to each other or to adopt a common running and machining area that is as great as possible.

In order to be linked to said mobile primary blocks and to be guided by said rails, the two carrying slide spindle heads 400 and 400' are provided at their extremities with return traverses arranged, as shown on FIG. 4, on each side of the central part of the $C_B$ formed by the vertical half tables 300 and 300', thus forming shapes likely to fit into each other. As a matter of fact, the pairs of guiding rails 310, 320 and 310', 320' along axis Y of the spindle heads are arranged separately on two planes perpendicular to the plane on which are arranged the fixed secondary blocks 430, 440 and 430', 440' of the linear motors ensuring the translational motion drive along Y of the spindle heads. Therefore, the laying C formed by the outside shape of each spindle head 400 and 400' is provided on its inner central part with the mobile primary blocks 410, 420 and 410', 420' of the linear motors ensuring their drive along axis Y and at the level of the inner part of its branches, with means allowing to cooperate with the vertical rail placed on each side of the vertical half table 300 and 300'.

As shown on the drawing of FIG. 2, the vertical half tables 300 and 300' carry the rules for measuring the motion of the spindle head along axis Y. Indeed, the return traverse formed by the branches of the C of the outside shape of each spindle head allows the placement of a measuring rule on the same plane as that of the guiding rail along axis Y.

The shape adopted by the spindle head 400 and 400' and the portal associated with it 300 or 300', that is the shape to two Cs or two Us perpendicular to each other, so that the branches of each one of them are placed on each side of the central part of the other one, has for advantage to better distribute the masses of the different mobile modules constituting the machine tool according to the invention. Such search for "balance" allows to diminish the stress on the different guiding and driving modules and consequently to increase the profitability.

On the other hand, the adopted forms allow for an almost perfect fit between the portal and the corresponding spindle head, so that the width of the spindle head is basically equal or greater than the length of the branches of the C formed by the portal, allowing thus the vertical half tables to come close to each other as much as possible in their opposite convergent motion along axis X. Such capacity to provide for a maximal adjustment between the two vertical half tables and consequently between the two slides, allows to increase the compactness of the machine tool M, to decrease the running time of a tool carried by a first slide to a second tool carried by the second slide, and that starting from the same point of the piece to be machined.

Another feature involved in the balance of the structure of the machine tool M of the invention is that the volume, and therefore the mass of the carrying slide spindle heads 400 and 400' are set on each side of the vertical guiding planes along axis X and Y.

Each spindle head 400 or 400' is each provided with a longitudinal receptacle along axis Z, opening towards each other, in which the slide 100 or 100' may be in motion. The shape of such receptacle is the section of a C, the branches of which are each provided on their inner surface with a guiding rail and a linear motor, that is for the spindle head 400, an upper rail 110 associated with a linear motor 120 and a lower rail 130 associated with another linear motor 140. Likewise, the spindle head 400' is provided with an inverted C shaped receptacle, the opening of which is oriented towards the opening of the C formed by the longitudinal receptacle arranged in the spindle head 400. The upper branch of such C is provided in its inner part with an upper guiding rail 110' associated with a first linear motor 120' and a lower guiding rail 130' associated with another linear motor 140'.

Unlike the driving elements along axis X and Y, the pairs of linear motors 120, 140 and 120', 140' allowing the translational motion along axis Z respectively of the slide 100 and 100' are mounted facing each other.

According to the shown embodiment, said longitudinal receptacles in which the spindle heads 400 and 400' receive the slide 100 and 100' they carry, are closed by means of a closing plate 450 and 450', allowing the spindle head 400 and 400' to become rigid at the level of the branches of the C formed by the receptacle provided into said spindle head.

It is understood that the high speed machining machine tool of the bi-broach type that was described and presented hereabove, was described and presented in view of publication rather than limitation. Of course, various arrangements, modifications and improvements may be brought to the above example without going beyond the scope of the invention taker, in its wider aspects and spirit.

Therefore, for instance, the number of linear motors and rails allowing the drive in translational motion and the guiding in translational motion along one of the three axis should not be limiting.

I claim:

1. A high speed machine tool capable of setting into motion two tool carrying slides along at least three axes and provided with a plurality of guiding means corresponding to rectilinear motions of the two slides along the three axes wherein said guiding means are comprised of pairs of guide rails. Said machine tool comprising linear motors including a mobile primary block and a fixed secondary block for implementing independent movement of the two slides, said mobile primary blocks of said linear motors insuring independent rectilinear motion of each of the two slides along at least the three axes by sharing a single block and a fixed secondary block wherein an axis of motion which is sharing a secondary block with two primary blocks is constituted by an axis of horizontal and transverse motion, said guiding means further comprising a first pair of rails arranged on a vertical plane of a vertical fixed frame on which two vertical half tables are guided for translating motion along a first horizontal transverse axis and a second pair of rails is provided on each of said tables for guiding a spindle head along a second transverse axis and in which a third pair of rails is disposed on which a slide is guided in translating motion along a third longitudinal axis perpendicular to the first two axes, said slide having a tool rotatably mounted on an extremity thereof, wherein the fixed vertical frame is provided with an opening between the two rails of the first pair which is partially occupied by a rear portion of the spindle heads.

2. The machine tool according to claim 1 wherein the two vertical half tables are arranged in such a way that the pair of guiding rails along the second transverse axis of the two spindle heads are arranged in two planes parallel to each and perpendicular to the guiding plane along the first transverse axis defined by said first pair of rails.

3. The machine tool according to claim 2 wherein the two vertical half tables are symmetrical with each vertical half table having a C-shape facing each other wherein the two slide carrying spindle heads are movable along the second transverse axis between branches of the vertical half tables which form the C-shape.

4. The machine tool according to claim 3 wherein the two slide carrying spindle heads are provided at extremities thereof with return traverses disposed on each side of a central part of said C-shaped half tables.

5. The machine tool according to claim 1 further comprising two measuring rules disposed between said two vertical half tables and two cursors mounted on said vertical half tables respectively, for providing measurements relating to movement of said vertical half tables.

* * * * *